US007302414B2

(12) United States Patent
Cox

(10) Patent No.: US 7,302,414 B2
(45) Date of Patent: Nov. 27, 2007

(54) ELECTRONIC DEVICE WITH AUTOMATIC CAPABILITY FOR LOCATION-SPECIFIC SOFTWARE CONFIGURATION

(75) Inventor: Michael John Cox, Herts (GB)

(73) Assignee: Francotyp-Postalia A.G. & Co. K.G. (DE)

( * ) Notice: Subject to any disclaimer, the term of this patent is extended or adjusted under 35 U.S.C. 154(b) by 1248 days.

(21) Appl. No.: 10/102,241

(22) Filed: Mar. 20, 2002

(65) Prior Publication Data

US 2002/0138452 A1 Sep. 26, 2002

(30) Foreign Application Priority Data

Mar. 21, 2001 (DE) ................................ 101 14 536

(51) Int. Cl.
*G06F 17/00* (2006.01)

(52) U.S. Cl. ...................................................... 705/401

(58) Field of Classification Search .................... 705/1, 705/401

See application file for complete search history.

(56) References Cited

U.S. PATENT DOCUMENTS 4,787,045 A 11/1988 Storace
5,638,283 A * 6/1997 Herbert ...................... 705/410
5,683,283 A * 11/1997 Glynn ........................ 446/128
5,852,813 A 12/1998 Guenther
5,943,658 A * 8/1999 Gravell et al. .............. 705/410
5,961,608 A * 10/1999 Onosaka et al. ............ 709/249
6,839,695 B2 * 1/2005 Igval .......................... 705/410

FOREIGN PATENT DOCUMENTS

EP 0 665 517 8/1995
EP 0 721 173 7/1996
EP 1 014 714 6/2000

OTHER PUBLICATIONS

"Telephone Usability: Voice is Just Another Datatype", by Jacob Nielsen, 1997, from useit.com, 3 pages.*

* cited by examiner

*Primary Examiner*—Dennis Ruhl
(74) *Attorney, Agent, or Firm*—Schiff Hardin LLP

(57) ABSTRACT

An electronic device, particularly a postage meter machine, has a central processing unit, at least one memory connected to the central processing unit in which at least one program unit is stored which the processing unit accesses for the configuration or the operation of the processing unit or of a function unit connected to the processing unit, and a position determination unit connected to the processing unit. A number of location-specific program units are stored in the memory and the processing unit is fashioned such that it accesses the location-specific program unit in the memory corresponding to the location of the device determined by the position determination unit.

5 Claims, 4 Drawing Sheets

ELECTRONIC DEVICE WITH AUTOMATIC CAPABILITY FOR LOCATION-SPECIFIC SOFTWARE CONFIGURATION

BACKGROUND OF THE INVENTION

1. Field of the Invention

The present invention is directed to an electronic device, particularly a postage meter machine, of the type having a central processing unit, at least one memory connected to the central processing unit and in which at least one program that the processing unit accesses for the configuration or the operation of the processing unit, or of a function unit connected to the processing unit is stored, and a position determination unit connected to the processing unit. The invention also is directed to a method for the operation or configuration of such an electronic device.

2. Description of the Prior Art

Electronic devices such as, for example, postage meter machines often must be differently configured for employment in different countries. This is necessary, for example, for the operating program, as well as for the configuration of the software that is accessed by the specific function units of the device access. In the case of a postage meter machine, this includes, for example, the data transmission device in the form of a modem or the like, a scale or the accounting module as well.

In known devices, the country-specific configuration usually ensues before the delivery to the ultimate user. This, however, is disadvantageous since the manufacturer or a authorized dealer usually must undertake a relatively time-consuming procedure for this purpose that increases the manufacturing or operating costs.

SUMMARY OF THE INVENTION

An object of the present invention is to provide a device and a method of the type initially described wherein the aforementioned disadvantage is less of a factor and which enables a simple and economic location-specific configuration of such a device.

The above object is achieved in accordance with the principles of the present invention in an electronic device, and a method for operating an electronic device, wherein a number of location-specific program units are stored in a memory, one of these program units being used by a software-operated unit in the electronic device, and wherein the location of the electronic device is determined by a position determination unit in the electronic device. Dependent on the location identified by the position determining unit, the appropriate location-specific program unit, corresponding to the identified location, is accessed from the memory for configuring the software-operated unit.

The present invention is based on the recognition that an especially simple and economic location-specific configuration of such a device is possible when a number of position-specific program units are stored in the memory and the processing unit accesses the program unit in the memory that corresponds to a position that has been identified as on the position of the device, determined by the position determination unit. The software configuration of the device can then occur automatically at the location which the device is installed without a separate intervention of an authorized person being required for this purpose.

All devices that, despite being used in different countries, have an identical hardware thus can be delivered directly or indirectly to the respective ultimate user without specific configuration for the country of employment. As a result, the outlay for the manufacture is reduced as well as the outlay for logistics, since different device versions need not be processed.

The position-specific program unit can be an executable, closed program, or it can be a sub-routine that is accessed proceeding from a higher-ranking program. The location-specific program unit can likewise contain a number of such programs or sub-routines in arbitrary combinations. Alternatively, the program unit need not contain an immediately executable program or sub-routine but only contains values for one or more configuration parameters that the configuration program accesses, and that serve for the location-specific configuration. Of course, the location-specific program unit also can contain programs, sub-routines and parameters in arbitrary combination.

The location-specific program unit can serve for the one-time configuration of one or more function units of the device. In preferred versions, the position-specific program unit forms at least a part of the operating program for the processing unit. As a result, it is possible to deliver the device with a minimal configuration that is the same for all devices and that is simple and fast to produce, and to automatically undertake the actual, more complicated operating configuration at the place of installation, which can include configuring any unconfigured portions of the operating program as well.

In other preferred versions of the inventive device, the processing unit is fashioned for the configuration of a function unit connected to the processing unit, and the location-specific program unit contains at least a part of the configuration parameters of the function unit. The position-specific program unit, moreover, also can contain all or a portion of the operating program of the function unit insofar as the function unit has its own processing unit. However, the function unit can also be fashioned such that its full functional capability is only available in collaboration with the central processing unit. In other words, the actual control of the function unit can entirely or partly ensue by means of the central processing unit, so that the function unit also forms the central processing unit in a certain sense.

The function unit can be any peripheral device that make a specific function of the main device available. In conjunction with postage meter machines, in particular, data transmission units such as modems or the like are an example of such a function unit since these must usually be set to the specific standards for the telecommunication devices in the respective country. In other preferred-versions of the inventive postage meter machine, the function unit is a postage calculating unit that serves for calculating the franking value to be printed.

In other preferred developments of the invention, the function unit is an accounting unit of the type regularly employed in postage meter machines. Here, the automatic configuration dependent on the installation location is especially advantageous since such an accounting unit is usually in a region of the device for which high security demands exist. As a result of the elimination of the position-specific configuration which must frequently be undertaken by an authorized person after the immediate manufacture, the possibilities for fraud or manipulation are reduced in conjunction with such an accounting module, so that additional security is obtained.

The position determination unit can be any device suited for this purpose. In versions that are preferred because they can be simply and economically realized, the positions determination unit is a GPS module. The position of the device can be very exactly determined in a simple way with such GPS modules as are available in the form of standard assemblies. Moreover, the exact location information supplied by these GPS modules also can be used for other applications of the device for which this location information is needed.

In another preferred embodiment, the position determination unit can be realized as a data transmission unit in the device that functions according to one or more mobile radiotelephone standards and enables the position determination in a known way by the acquisition of the position of the data transmission unit with respect to one or more cells of a mobile radiotelephone network.

In other versions of the inventive device, the processing unit is connected to a data transmission unit For fashioning the position determination unit, a program module is provided that is stored in a further memory connected to the processing unit and contains a number of location-specific dial-in numbers for the connection setup to location-specific, allocated data centers. The processing unit and the program module are fashioned such that the processing unit, given access to the program module, sequentially attempts the connection setup to the location-specific data centers, and the successful connection setup serves for the position determination.

This version is based on the recognition that the information about the country in which the device is located suffices for the above-described country-specific configuration, and unambiguous dial-in numbers are allocated to the data centers for the respective countries via the telecommunication network of the respective country, for example a fixed telephone network or a mobile radiotelephone network. When a connection setup succeeds with a specific dial-in number, then it is assured that the device is located in the country allocated to the dial-in number.

A successful data exchange need not necessarily occur between the device and the appertaining data center; rather, it can be sufficient for the data transmission unit to receive a suitable enable character from the cooperating location. This is particularly the case when the dial-in numbers are selected such that no cooperating locations in the country of installation are allocated to the dial-in numbers for the data centers of the other countries.

The data transmission unit in the versions wherein the position determination is employed for the configuration of the data transmission unit is operated in a manner configured for the country that is allocated to the dial-in number just selected. Of course, the corresponding location-specific program units are also sequentially accessed for the configuration of the data transmission unit.

This configuration of the data transmission unit matched to the dial-in number, however, can be omitted when the configuration of the data transmission unit assures merely an optimization of the data transmission, whereas a minimal configuration of the data transmission is all that is necessary for initial operation in all countries in order to effect the position determination as described above. This, for example, can be the case when the data transmission unit operates according to a mobile radiotelephone standard that is in use in all countries.

The present invention is also directed to a corresponding method for the operation or configuration of an electronic device, particularly a postage meter machine, dependent on its geographical position, wherein a location-specific program unit is selected as component of the operating program of a central processing unit, or is utilized for the configuration of a function unit of the device. Inventively, the location of the installation of the device is acquired and the location-specific program unit is selected dependent on the acquired location of the installation. All of the advantages already described above in conjunction with the inventive device can thus be achieved in the same way.

In preferred versions of the inventive method, the location of the installation location is determined with a GPS module or a mobile radiotelephone system. In other version of the inventive method, the location of the installation is determined by sequential attempts at a connection setup to location-specifically allocated data centers with at least respectively one dial-in number allocated to the respective data center via a data transmission unit of the device.

DESCRIPTION OF THE PREFERRED EMBODIMENTS

Figure 1:
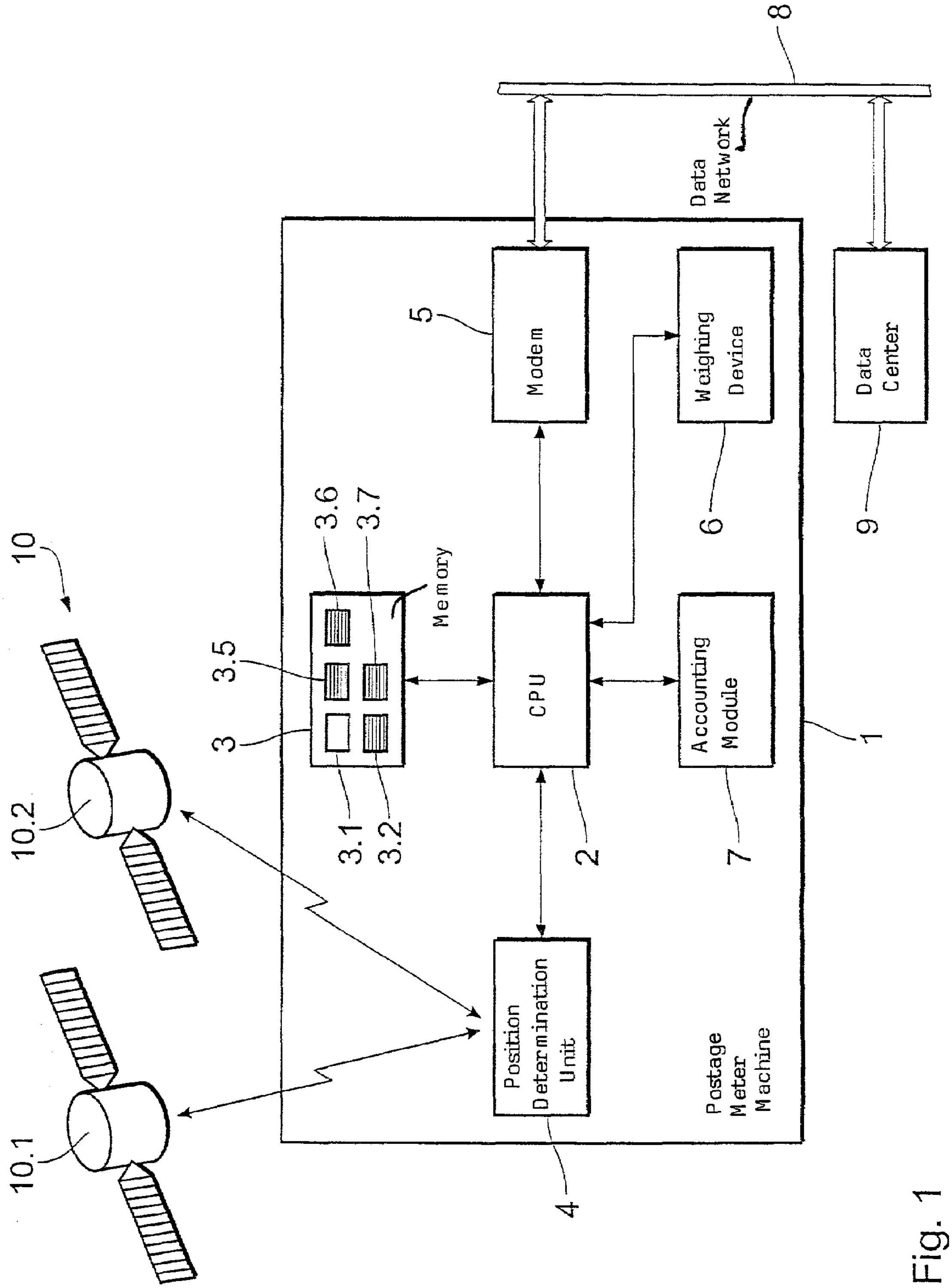
FIG. 1 is a block circuit diagram of a preferred embodiment of the inventive device.

FIG. 1 shows an electronic device in the form of a postage meter machine 1 having a central processing unit (CPU) 2 that is connected to a first memory 3, a position determination unit 4 and a number of units 5 through 7 that are allocated to different functions. These units are data transmission units in the form of a modem 5, a weighing device 6 and an accounting module 7.

The functioning of such a postage meter machine 1 can be briefly outlined as follows. Dependent on weight and possibly a number of other parameters, a piece of mail, for example a letter, is to be franked with a specific monetary amount in order to pay for conveying thereof by a carrier.

Accordingly, the weight of the letter is first identified with the weighing device 6, which contains or has access to a postage calculating unit. The measured signal supplied by the weighing device 6 is allocated to weight ranges stored in as postage tables, in which specific postage values are also stored allocated to the weight ranges. The postage values also may be dependent on further parameters such as the type of conveying, the degree to which the letters are pre-sorted, etc.

Subsequently, the letter is introduced into a printer device (not shown) connected to the processing unit 2 in order to print a franking imprint therewith. Registers in the accounting unit 7 are reduced by the corresponding value according to the required, printed postage value.

These registers have been set to a specific monetary value in a loading event at an earlier time. The loading event ensues via the modem 5, with which a data connection to a data center 9 is set up via a data network 8, for example a conventional telecommunication network.

The operating program of the central processing unit 2 as well as the configuration of the individual function units 5 though 7 are dependent on the installation location of the postage meter machine 1, due to different requirements that are specific to the country or the state in which the postage meter machine 1 is installed.

In order to realize the location-specific configuration of the operating program of the processing unit 2 corresponding to the installation location as well as of the individual function units 5 through 7, the position determination unit 4 is fashioned as a GPS module that interacts with the satellites 10.1 and 10.2 of a satellite system 10 for position determination and supplies a position signal to the processing unit 2 that corresponds to the identified geographical position.

Dependent on this position signal, the processing unit 2—controlled by a basic operating program stored in a first region 3.1 of the first memory—accesses one or more location-specific or country-specific program units stored in a second area 3.2 of the first memory 3 in the form of sub-routines and operating parameters that augment the basic program to form a location-specific, i.e. country-specific, operating program for the processing unit 2.

Whereas the basic operating program initially assures only at least the execution of the configuration and possibly further basic functions required for achieving this configuration phase, the complete country-specific functionality is available after this configuration with the corresponding country-specific operating program. This functionality, for example, then also includes country-specific prescribed menus or menu levels in the operating program via which, for example, parameters such as the type of conveying, degree of pre-sorting of the letters, etc., can be set.

The complete operating program then contains as configuration sequences, the individual function units 5 through 7 being location-specifically configured, i.e. country-specifically configured in the present example, when these are processed. It is self-evident that these configuration sequences can thereby already be entirely or partly contained in the basic operating program.

In the illustrated example, the modem 5 is first location-specifically configured by the processing unit 2 accessing a third memory area 3.5 of the first memory 3 dependent on the position signal supplied by the position determination unit 4. A number of location-specific program units are in turn stored in this third memory area 3.5 in the form of program sequences and operating parameters that are required for the operation of the modem 5. These are then forwarded to a modem control unit (not shown) of the modem 5 in order to configure the modem 5. The modem 5 then forms a complete function unit.

The control of the modem alternatively can be assumed by the central processing unit 2 in other versions, so that the modem 5, together with the central processing unit 2, forms the complete function unit.

This is true, for example, with regard to the configuration of the postage calculating unit, to which the weighing unit 6 is a part. Dependent on the position signal for the configuration of the postage calculating unit supplied by the position determination unit 4, thus, the central processing unit 2 loads the location-dependent postage tables, i.e. the country-specific postage tables here, with which the franking values are calculated by the central processing unit 2 in the above-described way. In other words, the postage calculating unit includes not only the weighing unit 6 but also the processing unit 2 connected thereto that implements the actual postage calculation.

The accounting unit 7 is configured in a way similar to that of the modem 5 by the central processing unit 2 accessing a fourth memory are 3.6 of the first memory 3 dependent on the position signal of the position determination unit 4. A number of location-specific program units are stored therein in the form of program sequences and operating parameters that are required for the operation of the accounting unit 7. These are then forwarded to an accounting control unit (not shown) of the accounting unit 7 in order to configure the accounting unit 7. The accounting unit 7 forms an independent function unit.

In other versions, only the position signal of the position determination device 4 need be forwarded to the accounting control unit of the accounting unit 7 for the configuration of the accounting unit 7. For the location-specific configuration, the accounting control unit accesses a memory connected thereto without intervention of the central processing unit 2, the location-specific program units being stored in this memory. This can be particularly required when, as usual, especially high demands are made on the security of the accounting unit 7, which may be disposed in a separate, closed housing that cannot be accessed by unauthorized parties without being detected. Together with the position determination unit 4, the accounting unit 7 then forms an electronic device in the sense of the invention.

The postage meter machine can include further function units, or further peripheral devices as are usually employed in a mail processing system can be connected to the postage meter machine. As warranted, these function units or peripheral devices can be configured in the above-described way using the position signal of the position determination unit.

Figure 2:
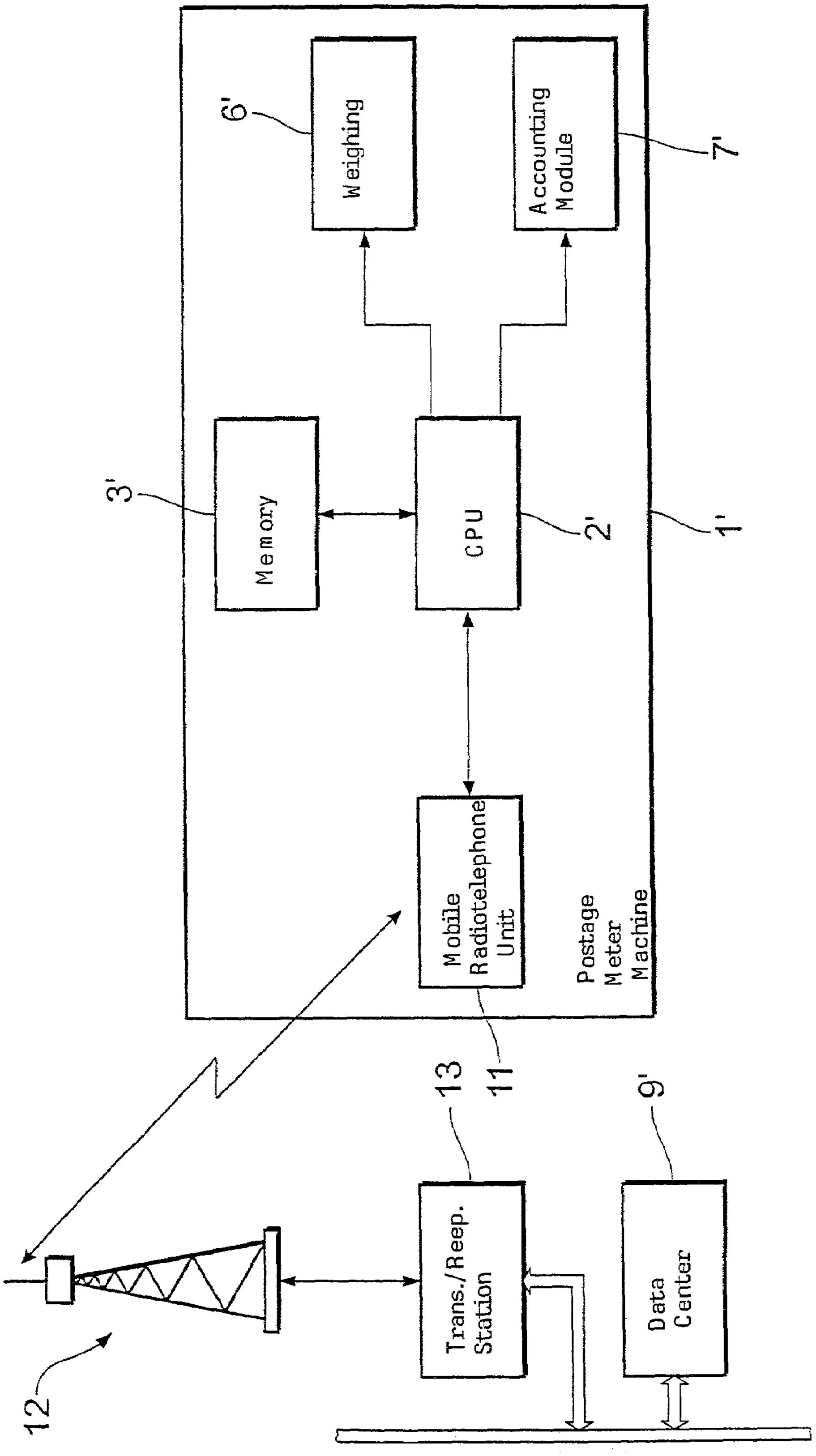
FIG. 2 is a block circuit diagram of another preferred embodiment of the inventive device.

FIG. 2 shows a further version of the inventive device that is the same as that from FIG. 1 in terms of its basic structure, so that only the differences shall be discussed.

The difference is that the position determination unit is a mobile radiotelephone unit 11 that can set up a data connection to transmission/reception stations 12 of a mobile radiotelephone network. The transmission/reception station 12 of the mobile radiotelephone network are connected to a mobile radiotelephone center 13. In a known way, the position of the mobile radiotelephone unit 11 is determined by the mobile radiotelephone unit 11 in the mobile radiotelephone center 13 on demand. In the simplest case, this occurs by identifying the transmission/reception station 12 via which the mobile radiotelephone unit 11 communicates with the mobile radiotelephone center 13. A more exact localization is possible in a known way if the signals of the mobile radiotelephone unit 11 are acquired by a number of transmission/reception stations 12 and the location of the mobile radiotelephone unit 11 can be more exactly identified on the basis of the intensity of the signals.

The mobile radiotelephone center 13 then sends a message with the corresponding location information via the transmission/reception station 12 to the mobile radiotelephone unit 11, which in turn forwards this to the central processing unit 2'. The location-specific configuration of the operating program of the processing unit 2' as well as the location-specific configuration of the function units of the postage meter machine 1', formed by the units 6' and 7', then in turn ensues in the way described above relating to FIG. 1.

In other versions, the position determination can ensue not in the mobile radiotelephone center 13 but by means of the mobile radiotelephone unit 11 or the central processing unit connected to it. To this end, in the communication between the mobile radiotelephone unit 11 and the transmission/reception station 13 of the mobile radiotelephone network, an identifier unambiguously identifying the transmission/reception station 13 is handed over to the mobile radiotelephone unit 11, the position of the mobile radiotelephone unit 11 and thus of the postage meter machine, being determined with adequate precision on the basis thereof. Preferably, this identifier already contains location information with respect to the geographical position of the transmission/reception station 13.

In the illustrated example, the mobile radiotelephone unit 11 is fashioned such that it can dial into mobile radiotelephone networks of the countries in which the postage meter machine can be used. Since these mobile radiotelephone networks may be operated with different frequency bands under certain circumstances, the mobile radiotelephone unit 11 is fashioned such that it can be operated in a number of frequency bands. This assures that a connection to at least one mobile radiotelephone network can be set up in every country of installation.

For the position determination, the mobile radiotelephone unit 11 first attempts to dial into a mobile radiotelephone network with a first frequency band. If this does not succeed, the mobile radiotelephone unit 11 changes the frequency band and starts another dial-in attempt. This occurs until a connection to a mobile radiotelephone network is a successfully set up. Dependent on the selected frequency band, the mobile radiotelephone unit 11, sequentially processing corresponding dial-in numbers, then attempts a connection setup to a mobile radiotelephone center 13 via which the position determination can then ensue in the above-described way.

In the illustrated example, the mobile radiotelephone unit 11 not only serves for the position determination, but also forms the data transmission unit via which the postage meter machine 1' can exchange data with a remote data center 9' in the above-described way or for the above-described purposes.

Figure 3:
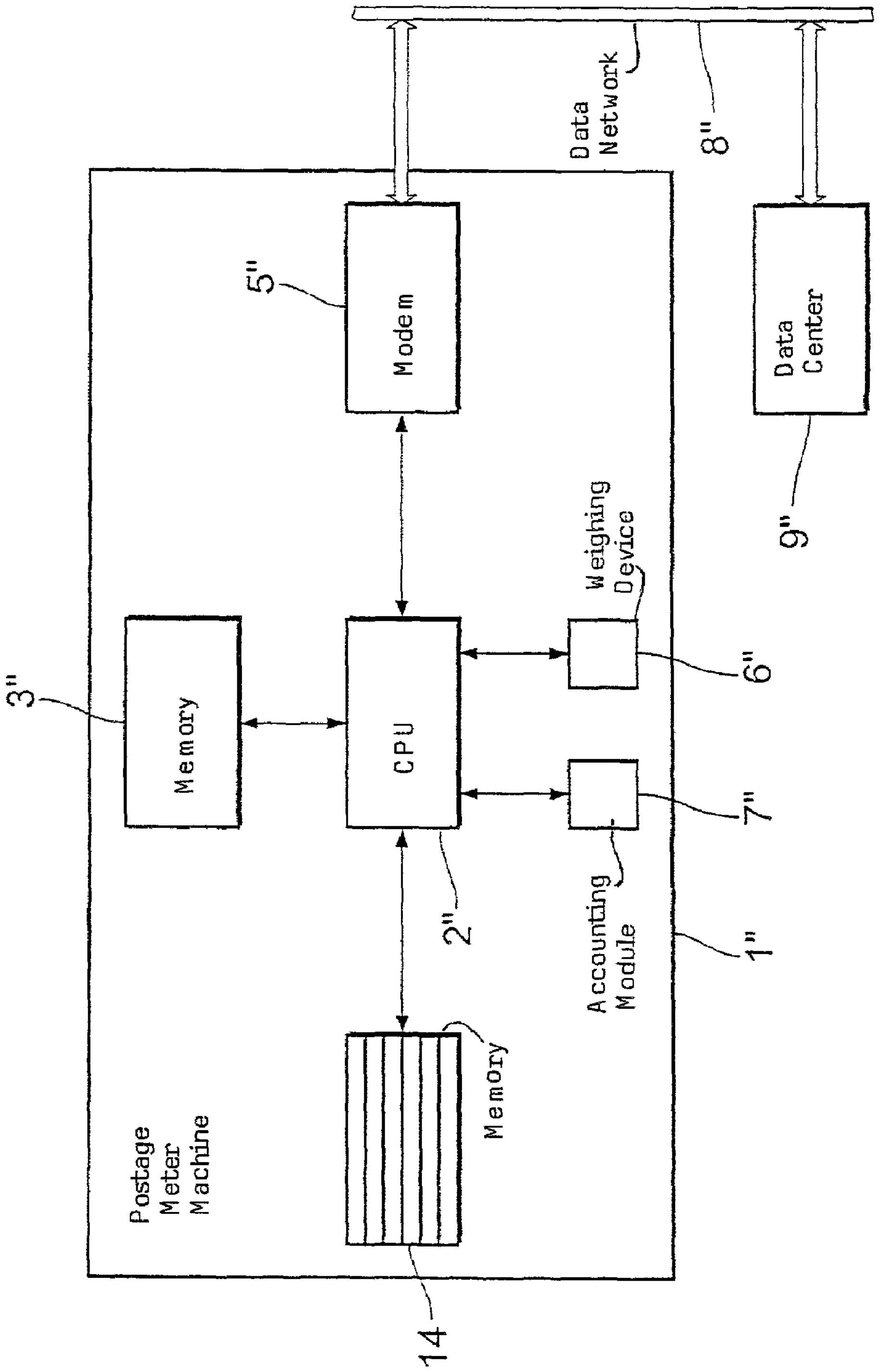
FIG. 3 is a block circuit diagram of another preferred embodiment of the inventive device.

FIG. 3 shows an alternative embodiment of an inventive postage meter machine. This postage meter machine 1" does not differ in basic-structure from the structure of the version described in FIG. 1, so that only the differences shall be described.

The difference is that a program module stored in a second memory 14 is provided for forming the position determination unit, the central processing unit 2" accessing this program module. A number of location-specific dial-in numbers for the connection setup to location-specifically allocated data centers 9" are stored in this program module.

Using the dial-in numbers of the program module, the processing unit 2" sequentially attempts the connection setup to the data center 9" via the telephone network 8" with the data transmission unit 5'. The dial-in numbers allocated to the data centers are stored in the program module without country prefixes, so that the connection setup succeeds only to the data center 9" that is actually allocated to the installation country. The data center 9" need not in fact be in the appertaining country. It suffices that a dial-in node in the appertaining country is allocated to it, this being reached in this country by the corresponding dial-in number. The successful connection setup to a data center 9" then serves for location determination insofar as the country in which the postage meter machine 1" was installed can be identified thereby, this sufficing for the described country-specific configuration.

Of course a successful data exchange between the postage meter machine 1' and the appertaining data center 9" need not necessarily occur. It can be sufficient for the data transmission device to acquire a suitable enable character from the cooperating location. This is the case if the dial-in numbers for the data centers are selected such that no cooperating locations are allocated, in the appertaining installation country, to the dial-in numbers for the data centers of the other countries, i.e. an attempted connection setup remains fruitless.

In the illustrated example, the position determination also serves for the configuration of the data transmission unit 5". At every attempted connection setup, the data transmission unit 5" is therefore operated configured for the country that is allocated to the dial-in number selected at the moment. Of course, the corresponding location-specific program units for the configuration of the data transmission unit 5" are also sequentially accessed in the way described above for FIG. 1. Given a successful connection setup, this configuration of the data transmission unit 5" is then permanently retained.

The configuration of the data transmission unit 5" matched to the dial-in number to be dialed at the moment can be omitted if the configuration of the data transmission unit 5" merely assures an optimization of the data transmission, whereas a minimal configuration of the data transmission unit 5" exists with which operation can be initially performed in order to realize the positioning in this way. This, for example, can be the case when the data transmission unit 5" operates according to a mobile radiotelephone standard employed in all countries and having a specific frequency band.

Figure 4:
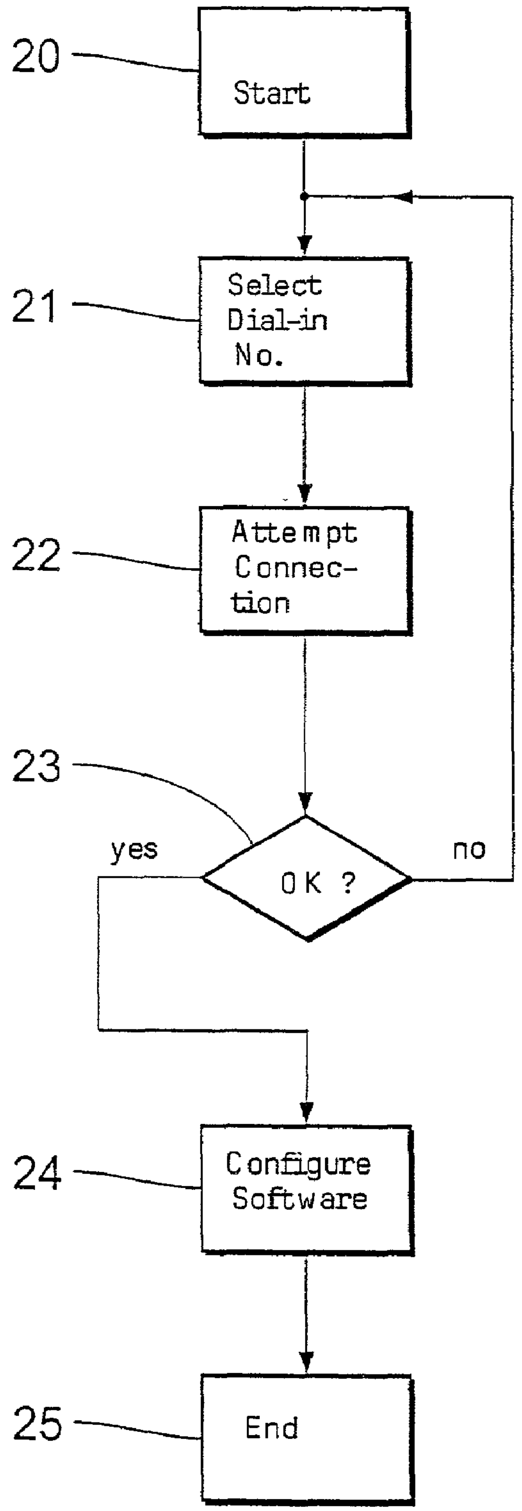
FIG. 4 is a flowchart of the version of the inventive method executed with the device of FIG. 3.

FIG. 4 shows a flowchart of the inventive method for configuring the postage meter machine that is implemented with the postage meter machine of FIG. 3.

This method is started in a step 20. The start can automatically ensue when the postage meter machine is turned on or can be initiated by a specific input by the operating person.

In a step 21, first, a dial-in number is selected with which a connection setup to the data center 9" is to be attempted via the data transmission unit 5". The processing unit 2" accesses the first dial-in number that is stored in the program module in the second memory 14.

In step 22, the previously selected dial-in number is forwarded to the data transmission unit 5", and the attempt of the connection setup to the data center 9" then follows upon employment of this dial-in number. At every connection attempt, the data transmission unit 5" is operated configured for that country that is allocated to the dial-in number selected at the moment. This configuration likewise ensues in the step 22 before the attempted connected setup. To this end, the central processing unit 2" sequentially accesses the corresponding location-specific program units for the configuration of the data transmission unit 5" in the way set forth above for FIG. 1.

In step 23, a check is made to determine whether a successful connection setup occurred with the most recently selected dial-in number. If this is not the case, a branch is made back to step 21, wherein the next dial-in number from the program module is then selected. The procedure subsequently continues in the way set forth.

When a successful connection setup occurs in step 23, a corresponding configuration of the operating software of the processing unit 2" as well as of the function units of the postage meter machine 1" ensues in step 24. The method subsequently ends at point 25.

Although the inventive device has been described above only on the basis of postage meter machines, it is clear that the invention can be employed in conjunction with arbitrary other electronic devices wherein a location-specific configuration of the operating software or of individual function units is required.

Further, the terms “location determination” and “position information,” as should be clear from the above-described exemplary embodiments, should not be interpreted as referring to an exact geographical position. Dependent on the application, on the contrary, a more or less imprecise determination of the location can suffice in order to meet the requirements for location identification in the sense of the invention. Acquiring the country in which the device is located thus can be adequate.

Although modifications and changes may be suggested by those skilled in the art, it is the intention of the inventor to embody within the patent warranted hereon all changes and modifications as reasonably and properly come within the scope of their contribution to the art.

I claim:

1. A method for location-specifically configuring an electronic device having a software-operated central processing unit, first and second memories accessible by said central processing unit and a software-operated data transmission unit, said method comprising the steps of:

storing a plurality of location-specific program units in said first memory;

storing a program module in said second memory, said program module containing a plurality of location-specific dial-in numbers for establishing a connection setup to respective location-specific data centers;

upon initialization of said electronic device, accessing said program module via said central processing unit and, via said data transmission unit, attempting respective connection setups to the respective data centers, and generating position information corresponding to a location of one of said respective data centers for which a successful connection setup occurs; and via said central processing unit, selecting from said first memory one of said location-specific program units corresponding to the location identified by said position information; and automatically location-specifically configuring at least one of said central processing unit and said data transmission unit using said one of said location-specific program units.

2. An electronic device comprising:

a software-operated central processing unit;

a software-operated data transmission unit connected to said central processing unit;

a first memory accessible by said central processing unit containing a plurality of location-specific program units for configuring at least one of said central processing unit and said data transmission unit;

a second memory accessible by said central processing unit, in which a program module is stored, said program module containing a plurality of location-specific dial-in numbers for establishing a connection setup, via said data transmission unit, to respective location-specific data centers; and said central processing unit, upon initialization, accessing said program module and sequentially attempting respective connective setups, via said data transmission unit, to the respective data centers, and generating position information corresponding to a location of one of said respective data centers for which a successful connection setup occurs, and dependent on said position information, selecting one of said location-specific program units from said first memory that corresponds to the location identified by said position information, and said central processing unit employing said one of said location-specific program units for location-specifically configuring at least one of said central processing unit and said data transmission unit.

3. An electronic device as claimed in claim 2 wherein said one of said location-specific program units forms at least a part of an operating program for said central processing unit.

4. An electronic device as claimed in claim 2 wherein said one of said location-specific program units contains at least a portion of configuration parameters for said data transmission unit.

5. An electronic device as claimed in claim 2 wherein said data transmission unit is a modem.

* * * * *